United States Patent
Xu et al.

(10) Patent No.: US 12,468,983 B2
(45) Date of Patent: Nov. 11, 2025

(54) MACHINE LEARNING (ML) MODEL PIPELINE WITH OBFUSCATION TO PROTECT SENSITIVE DATA THEREIN

(71) Applicant: THALES DIS CPL USA, INC., Austin, TX (US)

(72) Inventors: Feng Xu, Sunnyvale, CA (US); Haochong Shen, San Jose, CA (US); Yen-Fen Hsu, Sunnyvale, CA (US); Sudhir Kumar, Pune (IN)

(73) Assignee: THALES DIS CPL USA, INC., Austin, TX (US)

( * ) Notice: Subject to any disclaimer, the term of this patent is extended or adjusted under 35 U.S.C. 154(b) by 631 days.

(21) Appl. No.: 17/960,891

(22) Filed: Oct. 6, 2022

(65) Prior Publication Data

US 2024/0119170 A1    Apr. 11, 2024

(51) Int. Cl.
 *G06N 20/00* (2019.01)
 *G06F 21/62* (2013.01)
 (Continued)

(52) U.S. Cl.
 CPC ......... *G06N 20/00* (2019.01); *G06F 21/6245* (2013.01); *G06F 40/295* (2020.01); *G06N 3/08* (2013.01)

(58) Field of Classification Search
 CPC . G06N 20/00; G06N 3/08; G06N 3/09; G06F 21/6245; G06F 40/295;
 (Continued)

(56) References Cited

U.S. PATENT DOCUMENTS 10,339,465 B2 * 7/2019 Steele .................... G06N 20/00
10,540,606 B2 * 1/2020 Dirac .................... G06N 20/00
(Continued)

FOREIGN PATENT DOCUMENTS

CN    109858280 A    6/2019
CN    110134966 A    8/2019
(Continued)

OTHER PUBLICATIONS

International Search Report (PCT/ISA/2010) & Written Opinion (PCT/ISA/237) mailed by ISA/EP on Dec. 7, 2023 for corresponding International Application pursuant to the PCT, N°PCT/US2023/034544 (15 pages).
(Continued)

*Primary Examiner* — Michael Won

(57) ABSTRACT

Provided is a system and platform for Machine Learning (ML) based Data Discovery and Classification. The system and platform comprising components of a user console, a ML agent, and a ML data engine. By way of a ML pipeline, sensitive data is obfuscated that would otherwise by in the clear when transmitted to a centralized server. The ML model pipeline decouples embedding from model training. In a first step, the ML Agent runs on data endpoint machine or proxy to convert clear text data to embedding vectors. In a second step, the ML data engine runs on a centralized server to train models using the embedding vectors. The separation of pipeline components and respective handling of workflow requests and messages associated therewith prevents the transfer of clear data in the open. Other embodiments disclosed.

15 Claims, 11 Drawing Sheets

(51) Int. Cl.
*G06F 40/295* (2020.01)
*G06N 3/08* (2023.01)

(58) Field of Classification Search
CPC ....... G06F 7/023; H04L 41/16; H04N 21/251; H04N 21/466; H04N 21/45; H04N 21/4662
See application file for complete search history.

(56) References Cited

U.S. PATENT DOCUMENTS

| | | | |
|---|---|---|---|
| 10,606,946 B2 | 3/2020 | Gao et al. | |
| 10,678,816 B2 | 6/2020 | Peng et al. | |
| 11,100,420 B2* | 8/2021 | Dirac | G06N 20/00 |
| 11,182,562 B2 | 11/2021 | Lee et al. | |
| 11,182,691 B1* | 11/2021 | Zhang | G06N 20/20 |
| 11,270,225 B1 | 3/2022 | Lockett | |
| 11,379,608 B2* | 7/2022 | Swafford | H04L 63/1408 |
| 12,069,091 B2* | 8/2024 | N | G06N 20/00 |
| 12,255,906 B2* | 3/2025 | Zhang | G06F 21/566 |
| 2020/0142999 A1 | 5/2020 | Pedersen | |
| 2020/0184339 A1 | 6/2020 | Li et al. | |
| 2024/0004685 A1* | 1/2024 | Ye | G06N 20/00 |

FOREIGN PATENT DOCUMENTS

| | | |
|---|---|---|
| CN | 111191275 A | 5/2020 |
| WO | 2021080577 A1 | 4/2021 |

OTHER PUBLICATIONS

Samuel Sousa et al: "How to keep text private? A systematic review of deep learning methods for privacy-preserving natural language processing", IACR, International Association for Cryptologic Research vol. 20220516:145418; May 16, 2022 (May 16, 2022), pp. 1-59, XP061074986, Retrieved from the Internet: URL:https://eprint.iacr.org/archive/2022/580/1652712858.pdf; [retrieved on May 16, 2022]; Section 4.2.1.

Martinelli Fabio et al: "Enhanced Privacy and Data Protection using Natural Language Processing and Artificial Intelligence", 2020 International Joint Conference on Neural Networks (IJCNN), IEEE, Jul. 19, 2020 (Jul. 19, 2020), pp. 1-8, XP033831134, DOI: 10.1109/IJCNN48605.2020.9206801; [retrieved on Sep. 25, 2020] Section IV. Process Details and Components.

* cited by examiner

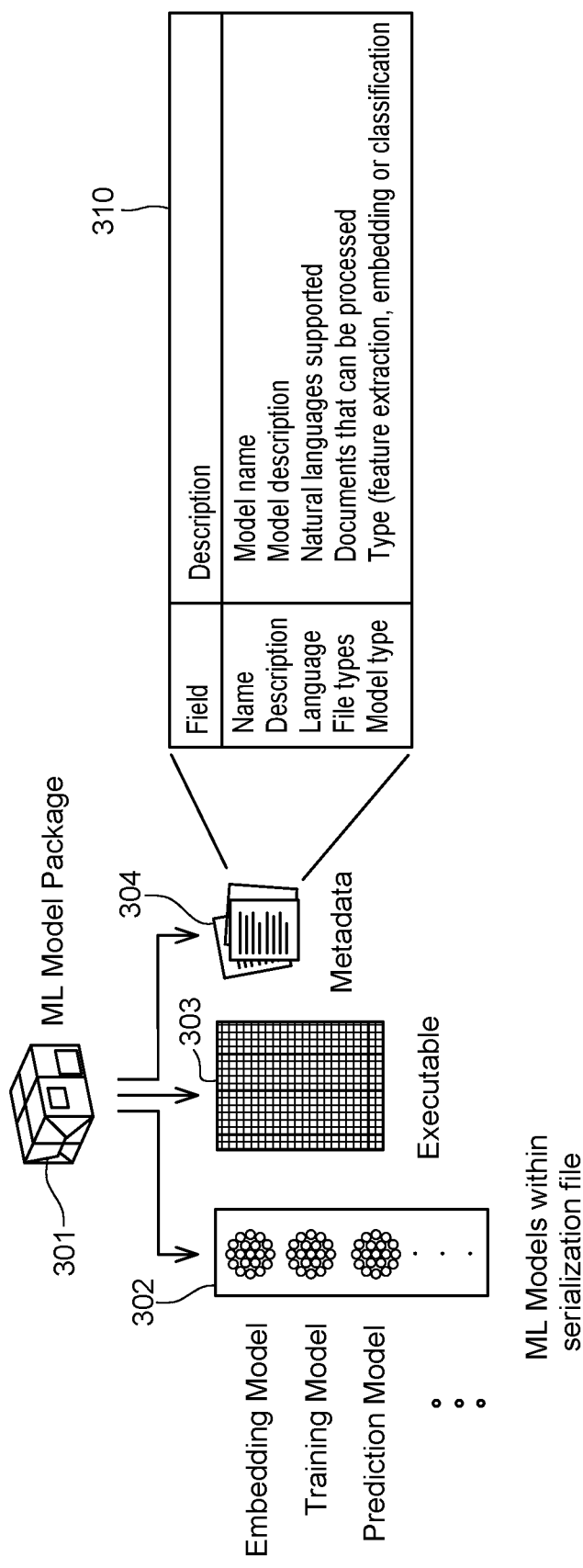
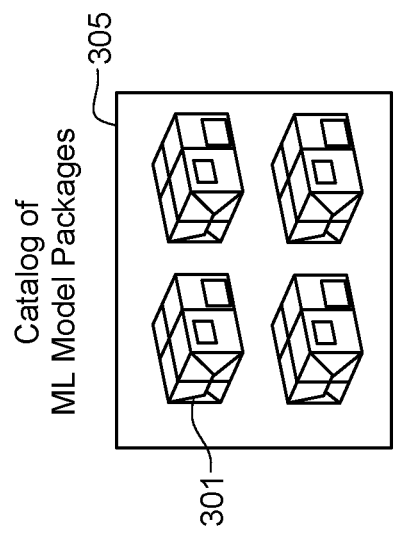
Fig. 2A
Fig. 2B

ML model package catalog management description

1. End user uploads, downloads, deletes and views ML model package (301) through User console (100) UI.

2. Through ML data engine (300) REST API, User console UI (100) uploads, downloads and deletes ML model package (301), retrieves and modifies ML model package metadata.

3. ML data engine (300) deletes and retrieves ML model package from storage, persists ML model package to storage, retrieves and modifies ML model package metadata in storage.

4. User console (100) displays ML model package in UI.

ML embedding scan description

1. End user submits embedding scan request from User console (100) UI. The request contains embedding model package (301) identification, ML agent host and folder information.

2. User console (100) sends embedding scan request to ML data engine (300) through REST API, and ML data engine (300) adds embedding scan request into storage.

3. ML agent (200) polls and gets embedding scan request from ML data engine, downloads embedding model package (301) specified in request, instantiates model executable and loads model serialization file into memory.

4. ML agent (200) scans folder specified in request.

5. ML agent (200) calls "predict" interface exported from model executable for each scanned file, and gets embedding vector.

6. ML agent (200) sends embedding vector to ML data engine(300) through the distributed event store and stream-processing platform.

7. ML data engine (300) receives embedding vector from the distributed event store and stream-processing platform and saves embedding vector to storage.

8. ML data engine (300) updates request status to "success" or "fail" for user console (100) to retrieve and display.

410
Fig. 4B

On-line training description

1. End user submits data label from User console (100) UI.

2. User console (100) sends data label to ML data engine (300) through REST API.

3. ML data engine(300) saves data label into storage.

4. End user submits model training request from User console (100) UI. The request contains training model package (301), label and embedding identification information.

5. User console (100) sends model training request to ML data engine (300) through REST API, and ML data engine (300) adds model training request into storage.

6. ML data engine (300) training worker gets model training request from storage, instantiates model executable, calls "fit" interface exported from model executable with label and embedding vector as input parameters and starts training process. If training is successful, ML data engine (300) saves trained model serialization file and related model executable into storage.

7. ML data engine (300) saves trained model metadata record into storage if training is successful.

8. ML data engine (300) updates request status to "success" or "fail" for User console (100) to retrieve and display.

9. End user submits prediction scan request from User console (100) UI. The request contains trained prediction model package (301) identification, ML agent host and folder information.

10. End user reviews prediction scan result, updates data label and start new training to improve previous trained model.

ML prediction scan description

1. End user submits prediction scan request from User console (100) UI. The request contains trained prediction model package (301) identification, ML agent host and folder information.

2. User console (100) sends prediction scan request to ML data engine (300) through REST API, and ML data engine (300) adds prediction scan request into storage.

3. ML agent (200) polls and gets prediction scan request from ML data engine, downloads prediction model package (301) specified in request, instantiates model executable and loads model serialization file into memory.

4. ML agent (200) scans folder specified in request.

5. ML agent (200) calls "predict" interface exported from model executable for each scanned file to classify data category and identify sensitive entity.

6. ML agent (200) sends data category and sensitive entity to ML data engine (300) through a distributed event store and stream-processing platform.

7. ML data engine (300) receives data category and sensitive entity from a distributed event store and stream-processing platform and saves them to storage.

8. ML data engine (300) updates request status to "success" or "fail" for User console (100) to retrieve and display.

MACHINE LEARNING (ML) MODEL PIPELINE WITH OBFUSCATION TO PROTECT SENSITIVE DATA THEREIN

TECHNICAL FIELD

The present invention relates generally inference methods or machines, and more specifically, to on-line machine learning and classification of big data in the cloud and traditional enterprise computer environments, and more particular, to protection of sensitive and private data during on-line machine learning.

BACKGROUND

Data privacy and security regulations including GDPR, CCPA, LGPD, PCI DSS and HIPAA impose strict requirements on how data is accessed and handled. Accordingly, activities centered around discovering and classifying sensitive data across an organization in all data repositories must comply with these regulations. Many organizations do not have inventory on their data, let alone, what data is sensitive or private or what data is subject to privacy regulations.

Machine learning models have been used to discover and classify sensitive data for such purposes. However, many of the machine learning based data discovery and classification products available in the market require the transfer of data in clear text from one location to a centralized server at another location for model training. This poses a risk to data security and the possibility of data leaks, since data in the clear is unprotected.

A need therefore exists for protecting sensitive data in transit for machine learning based data discovery and classification.

SUMMARY

In one embodiment, a system and platform for Machine Learning (ML) based Data Discovery and Classification is provided. Generally, it classifies documents into categories and subcategories, discovers sensitive entities, and determines sensitivity levels More specifically, it generates document and token embeddings from a machine learning agent that runs on an data endpoint machine or proxy and ingest the embedding into centralized machine-learning server for model training. The embedding obfuscates data that would otherwise by in the clear to a centralized server. It advantageously allows users to comply with existing data security policies and to avoid extra cost on data security administration. The system and platform comprising components of a user console (100), a ML agent (200), and a ML data engine (300). The components execute on a computational device comprising one or more processors and memory coupled to the one or more processors, wherein the memory includes computer instructions which when executed by the one or more processors causes the one or more processors to perform the respective operations of the components.

In some embodiments, the user console (100), runs on an endpoint machine at a location managing and accessing data in a security zone under a security policy, said data in part is private or sensitive, for processing user requests for data discovery and classification (DDC) on the endpoint machine, ingesting user requests into a ML pipeline for embedding, training and deploying ML models on said data produced via DDC, and displaying classified data category and identified sensitive entities of said data on the endpoint machine by way of the ML pipeline.

In some embodiments, the ML agent (200) is communicatively coupled to the user console, also running on the endpoint machine and residing at the location, for polling said user requests by way of the ML pipeline, scanning the endpoint machine for said data responsive to user requests, embedding said data to produce an embedding vector that is ingested into the ML pipeline instead of clear data, and applying ML models to the data scanned.

In some embodiments, the ML data engine (300) is communicatively coupled to the user console and the ML agent, and not residing at the location with said security zone, for handling user requests from user console and ML agent on the ML pipeline, receiving said embedding vector on the ML pipeline, labeling said embedding vector with labels responsive to user annotations, and persisting, training, updating, and applying ML models for use by the ML agent.

In some embodiments, the embedding is an applied security measure that complies with said security policy and obfuscates sensitive data on the ML pipeline when moving data from a higher security zone to a lower security zone. In some embodiments, the embedding provides a solution for compliance with user-privacy laws and protects against leakage of sensitive data. In some embodiments, sensitive entities includes private information or private data including, but not limited to: URL, entity, gender, sex, race, ethnicity, occupation, marital status, citizenship, or phone numbers.

In some embodiments, the ML pipeline codifies and automates a ML workflow for data discovery and classification in the user console, the ML agent and the ML data engine, and said workflow provides for processing requests, handling messages, data scanning, embedding data, sampling, annotating, cleaning, training models, persisting models, and applying models. In some embodiments, communication on the ML pipeline for each workflow, by and between the user console (100), the ML agent (200) and the ML data engine (300), is via RESTful Application Programming Interfaces (APIs). In some embodiments, the ML data engine (300) comprises a Deep Neural Network (DNN) to classify unstructured data; and a Named Entity Recognition (NER) to detect sensitive entities within said unstructured data.

In some embodiments, the ML model is one of an ML embedding model to generate an embedding vector from said data; a ML training model based on annotation labels and embedding vectors; and a ML prediction model to classify said data and identify sensitive entities within said data. The ML pipeline supports workflows consisting of: an ML model embedding scan workflow; an ML model on-line training workflow; and an ML model prediction scan workflow.

In some embodiments, the ML model consists of: a metadata record consisting of ML model information, such as, identifier (ID), name, model type, national language, target file type, serialization file, executable binary, executable artifact and model description; a serialization file that converts data objects of the ML model into a transmittable format over the ML pipeline; and an executable binary that implements a predefined public call interface, which is invoked over the ML pipeline to interact with training, embedding and trained prediction models.

In some embodiments, the ML model package catalog management is provided via the user console (100), that by way of the ML data engine (300), processes user input for uploading, downloading, deleting and viewing ML model packages for ML embedding models, ML training models and ML prediction models; and displays package information and utilities on the ML pipeline for performing each of the three workflows.

In some embodiments, for the embedding scan workflow: the user console (100) responsive to user input submits an embedding scan request on the ML pipeline; the ML agent (200) polls and retrieves the embedding scan request on the ML pipeline and downloads downloads, instantiates, and runs the ML embedding model; the ML agent (200) scans a folder identified in the user request, the folder containing data on the endpoint machine; and the ML agent (200) embeds the data using the ML embedding model and submits the embedding vector, with obfuscated data therein, to the ML pipeline.

In some embodiments, for the ML model on-line training workflow: the user console (100), responsive to the embedding scan workflow, thereafter receives data labels submitted by the user for the embedding vector, and submits a model training request with the data labels on the ML pipeline; the ML agent (200) polls and retrieves the on-line training request on the ML pipeline with the data labels, and downloads downloads, instantiates, and runs the ML training model; the ML data engine (300) samples multi-dimensional vector data points of the embedding vector into a number of groups by way of K-Means clustering; annotates the embedding vector in the groups with the user-provided data labels for classification for named entity recognition; applies a semi-supervised machine learning by way of K-Nearest Neighbors to propagate document labels to surrounding unlabeled data points; and applies supervised machine learning by way of a Neural Network to train the ML prediction model using embedding vector with labels as inputs.

In some embodiments, for the ML model prediction scan workflow: the user console (100) handles a user request responsive to the user submitting a prediction scan request on the ML pipeline; the ML agent (200) polls and retrieves the prediction scan request on the ML pipeline and downloads downloads, instantiates, and runs a package for the ML model; the ML agent (200) scans a folder for data identified in the user request and embeds the data using the ML embedding model from the package and submits the embedding vector to the ML pipeline; the ML data engine (300) responsive to an interface call for prediction, retrieves the embedding vector from the ML pipeline, applies the ML prediction model from the package to each scanned file in the folder, and classifies the data into data categories and identifies sensitive entity in the data categories.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 2A illustrates components of an exemplary ML model package in accordance with an embodiment;

FIG. 2B depicts a catalog of ML model packages of FIG. 2A in accordance with an embodiment;

FIG. 3B describes activities associated with ML model package management in accordance with an embodiment;

FIG. 4B depicts exemplary states of the workflow of FIG. 4A for a ML embedding scan in accordance with an embodiment;

FIG. 5B depicts exemplary states of the workflow of FIG. 5A for on-line training of ML models in accordance with an embodiment;

FIG. 6B depicts exemplary states of the workflow of FIG. 6A for deploying prediction models to classify scanned data and identify sensitive entities therein in accordance with an embodiment.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
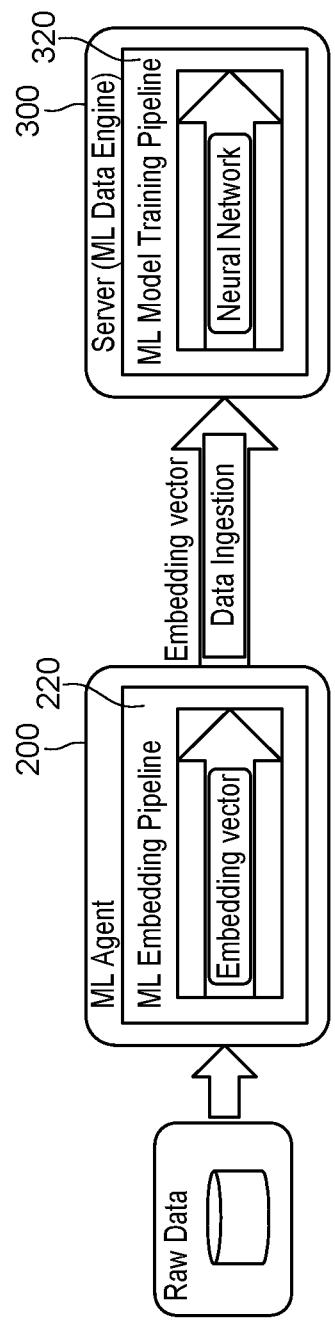
FIG. 1A illustrates a ML pipeline to obfuscate data for machine learning based data discovery and classification for compliance with data privacy regulations in order to protect against the exposure of sensitive data in accordance with an embodiment.

In accordance with one embodiment, FIG. 1A illustrates a ML pipeline 120 to obfuscate raw data for machine learning based Data Discovery and Classification (DDC) for compliance with data privacy regulations. This configuration of the ML pipeline 120, where the raw data is embedded prior to data ingestion, protects against the exposure of sensitive information in the raw data. The ML model pipeline 120 decouples the embedding stage from model training stage. The underlying ML embedding pipeline 220 is separate and distinct from the ML model training pipeline 320, with respect to spatial and temporal dependencies. Accordingly, model training becomes a two-step process. In a first step, a ML Agent 200 runs on data endpoint machine or proxy to convert clear text data to embedding vectors. In a second step, a ML data engine 300 runs on a centralized server to train models using the embedding vectors. The separation of pipeline components (220/32) and respective handling of workflow requests and messages associated therewith prevents the movement of clear data from the data endpoint machine running the ML agent 200 to the centralized server running the ML data engine 300.

The front end of the ML model pipeline is the ML embedding component 220, managed by the ML agent 200, comprises an input layer and an embedding layer at a branch location under a security zone with a security policy overseeing sensitive data. The back end of the ML model is the ML model training component 320, managed by the ML data engine 300, comprises several neural network layers and an output layer at a different location apart from the branch location, under a different level security zone with a different security policy. The ML model pipeline 120 provides for model training with embedding vectors as input instead of clear text, which ensures data security and is more efficient from a performance perspective. This is because the deciphering of embedding vectors to clear text to train the models, as done by typical ML systems, where the embedding is performed after data ingestion (instead of before) is process intensive and computationally burdensome.

Figure 1B:
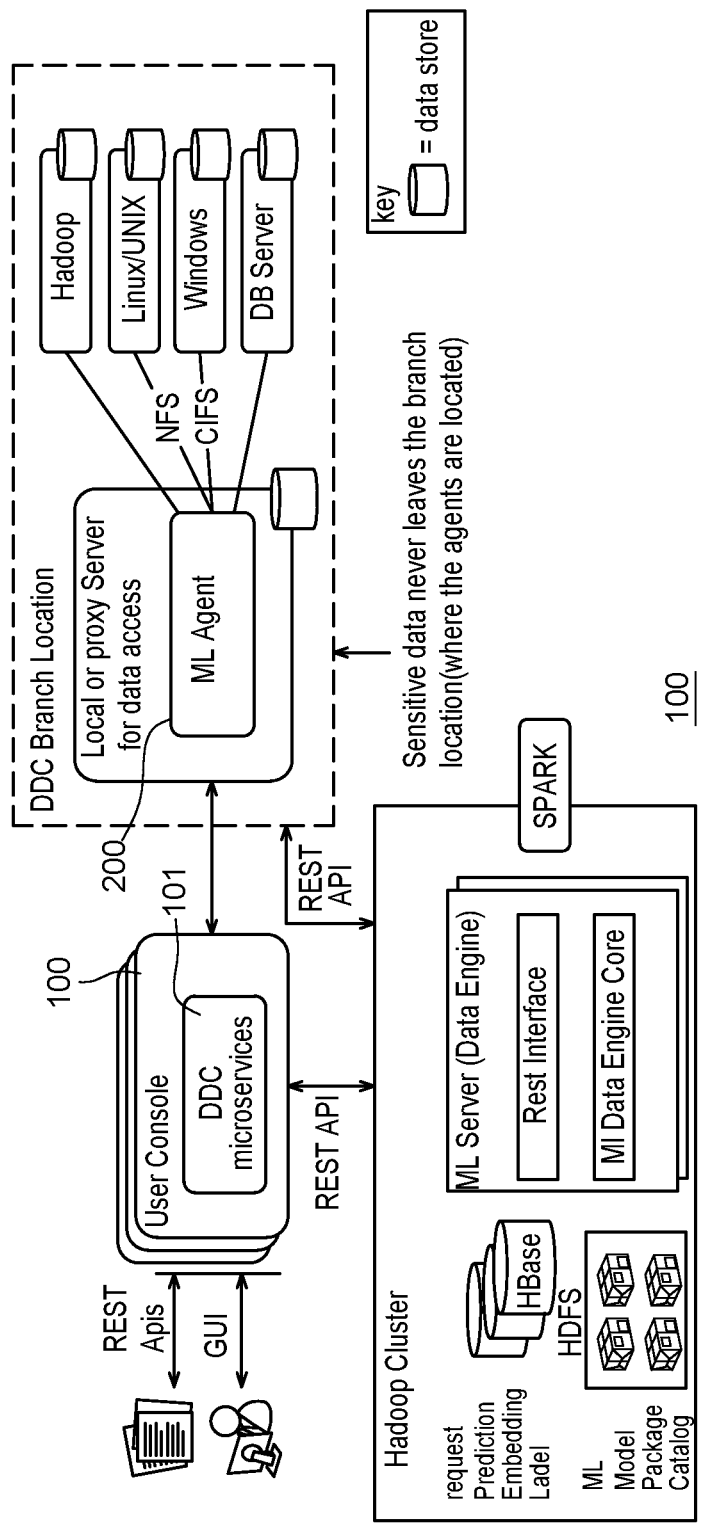
FIG. 1B depicts a system for machine learning based data discovery and classification that obfuscates data by way of the ML pipeline, and thereby protect sensitive data in accordance with an embodiment.

FIG. 1B depicts a system 100 for machine learning based data discovery and classification that by way of the ML pipeline 120 obfuscates data and thereby protects sensitive data in accordance with one or more embodiments. The primary components of the system 100 comprise a user console 100, a ML agent 200 and a ML data engine 300 (ML server). As seen on the left, users, such as a customer or client, interact with the user console 100 by way of a Graphical User Interface (GUI), and/or use REST based APIs to create classification profiles, add data stores, launch scans and generate reports. As an example, from the user's perspective, the user console 100 automatically parses sentences in documents (files) to identify keywords, the class the keywords fall into, relationships between each keyword, and then uses data models to quickly classify categories and determine the sensitivity of each file. The system 100 provides the user with a clear and visible understanding of what sensitive data they have, where it is located, and its risks of exposure. It allows users to uncover and close data gaps, make better decisions about third-party data sharing and cloud migration, and proactively respond to data privacy and security regulations including GDPR, CCPA, LGPD, PCI DSS and HIPAA.

The ML data engine 300 helps users and organizations get complete visibility into their sensitive data with efficient data discovery, classification, and risk analysis across heterogeneous data stores—the cloud, big data, and traditional environments—in an enterprise environment. The system 100 supports a number of these different data stores. In order to access these data stores, the DDC microservices 101 communicates with one or more ML Agents 200. The ML Agent 200 is a software component that is used to scan a data store for Infotypes (such as credit card numbers, email addresses and so on) that are part of a classification profile. All data that is collected is sent from the ML Agent 200 to the DDC microservices 101 which stores the data, together with any user requested reports, on an external Hadoop cluster.

The system 100 uses Hadoop cluster to generate reports from scans and to store their results (report data). Hadoop is a collection of computers, known as nodes, that are networked together to perform these kinds of parallel computations on big data sets. Spark is used to process the data and stores it in HDFS. The Hadoop Distributed File System (HDFS) stores files in block-sized chunks called data blocks. Stored here are also the requests for prediction embedding labels, the embedding labels, and the ML model package catalog. The ML data engine 300 provides a REST interface for communication with the user console 100 and the ML agent 200, and a MI data engine core. Core classification profiles are prebuilt and aligned with major data laws and regulations, both regional and global. The user can make changes to these or add totally new profiles if required. During this process, the user select one or more infotypes of interest.

The system 100 is prebuilt with various infotypes covering the vast majority of regional and global data privacy laws and regulations. When a prebuilt classification profile template is selected, the appropriate subset of infotypes is added automatically. The user can modify or extend this list by creating their own custom infotypes, allowing rules to be defined which describe precisely how the scanning engine should look for the data strings in question. Full access to the groups and categories is available as part of the definition so that data matches can be displayed in the appropriate sections of the scan results.

The ML agent 200 performs the data scans requested by the user. It performs detailed data analysis from the scanning and reports results back to the DDC microservices for analysis and processing. Two types of agents exist—local and proxy. The user would normally install local agents on data store locations (for which they have the appropriate access rights) to ensure the data never leaves the server for security or performance reasons. In contrast, proxy agents are used for network or remote data stores where a separate proxy server hosts the agent.

When the user is scanning data stores that are local to Windows or Linux (no network shares), the ML Agent 200 would be installed on the server where the data is located. For all other types of storage (top right side of the figure), the ML Agent 200 would be installed on a proxy server. For example, in the case where a user wants to scan an NFS share, it would be mounted on the proxy server and the ML Agent 200 would be installed on the proxy server. By way of the user console 100, the user specifies the mount point of the NFS share when creating the scan.

Briefly, NFS is a client-server application that permits transparent file sharing between servers, desktops, laptops and other devices. Using NFS, users can store, view and update files remotely as though they were on their own computer. CIFS (Common Internet File System) is a protocol that gained popularity around the year 2000, as vendors worked to establish an Internet Protocol-based file-sharing protocol. CIFS is now considered obsolete, because most modern data storage systems use the more robust Server Message Block (SMB) 2.0 and 3.0 file-sharing protocols, which were major upgrades to CIFS. CIFS/SMB and the Network File System (NFS) are the two major protocols used in network-attached storage (NAS) systems.

When the system 100 is configured for machine-learning (ML) based data discovery and classification (DDC), the user console 100, ML agent 200, and ML data engine 300 perform additional roles and provide for additional functionality on the ML pipeline 120. Here, the user console 100 serves as a ML management console, that takes user request, ingest user request into ML data engine 300 through REST API, get results from ML data engine 300 through REST API, and display result in the user interface (UI). The ML agent 200 is a light-weight daemon program running on data endpoint machine or proxy, that polls request from ML data engine 300 through REST API, downloads embedding or prediction model from ML data engine 300 through REST API based on request type, scans local or remote data (e.g., on the endpoint machine, or selected network drive), applies an embedding or prediction model to scanned data, and return embedding or prediction result back to ML data engine 300 (e.g. via Apache Kafka). The ML data engine 300 is an active-active cluster integrated with Hadoop, and by way of REST APIs, handles request from User Console 100 and ML agent 200. It persists (saves and stores) the request, annotation label, embedding vector and prediction result in a database (e.g., Apache HBase®). It persists machine learning model package in Apache HDFS and Hbase, ingests embedding and prediction result from ML agent 200 (e.g. via Apache Kafka®) and trains machine learning model (e.g., via Apache Spark™)

FIG. 2A illustrates components of an exemplary ML model package in accordance with an embodiment. Each ML model package may include one or more ML models. There are three types of ML models in the system 100 platform: 1) a ML Embedding model that is used to generate embedding vector from data, 2) a ML Training model that is used to train a prediction model based on annotation label and embedding vector, and 3) a ML Prediction model that is generated by a training process based on an ML training model and is used to classify data and identify sensitive entity. The ML embedding model consists of a model executable and metadata. The ML training model and ML prediction model consists of model executable, serialization file and metadata. The ML prediction model is unique also in that it also references an embedding model.

FIG. 2B depicts a catalog 305 of ML model packages 301 in accordance with an embodiment. By way of the serialization file 302, executable 303 and metadata 304, the ML model packages are plug and play to facilitate their discovery on the ML pipeline 120 without the need for physical device configuration or user intervention in resolving resource conflicts. In this regard, the system 100 is a ML platform that is "open" for ML model to plug and play. Each ML Model is packaged based on predefined public call interface and metadata record format available, thereby can be shipped/delivered as an out-of-the box model package. This allows the user to provide a custom model package that complies to the call interface and metadata record format Metadata 304 is a record for ML model information needed for building, updating and deploying the model. The metadata record consists of ML model information such as id, name, model type, national language, target file type, serialization file, executable file, executable artifact and description, and is uniquely identified by id. It may further include training parameters, evaluation metrics, prediction examples, dataset versions, testing pipeline outputs, artifacts, references to model weights files, and other information. As seen it may include multiple field and description entries, such as, name: model name, description: model description, language: natural languages supported, file types: documents that can be processed; model type; type (feature extraction, embedding, or classification). The serialization file 302 is a compact representation of the data objects constituting the ML model, and is in a format that allows for efficient storage and transmittal of the ML model by way of the ML pipeline 120. The executable 303 is a binary file containing an encoded sequence of instructions that a hardware processor can execute thereon. The binary file may be static or dynamic, depending on its compilation and build instructions. But, in general, a binary file, follows a format, for example, an executable and linkable format, which allows for a central processing unit (CPU) of a computer or mobile device to execute and run the binary. As illustrated, the binary file will include a header section, a symbols section, other sections (e.g. text, data, etc.) and linking information. These sections constitute the mobile app binary for execution on a CPU. The executable binary implements the predefined public call interface, for the plug and play functionality, which can be invoked by the system 100 platform to interact with ML training, ML embedding and ML (trained) prediction models.

Figure 3A:
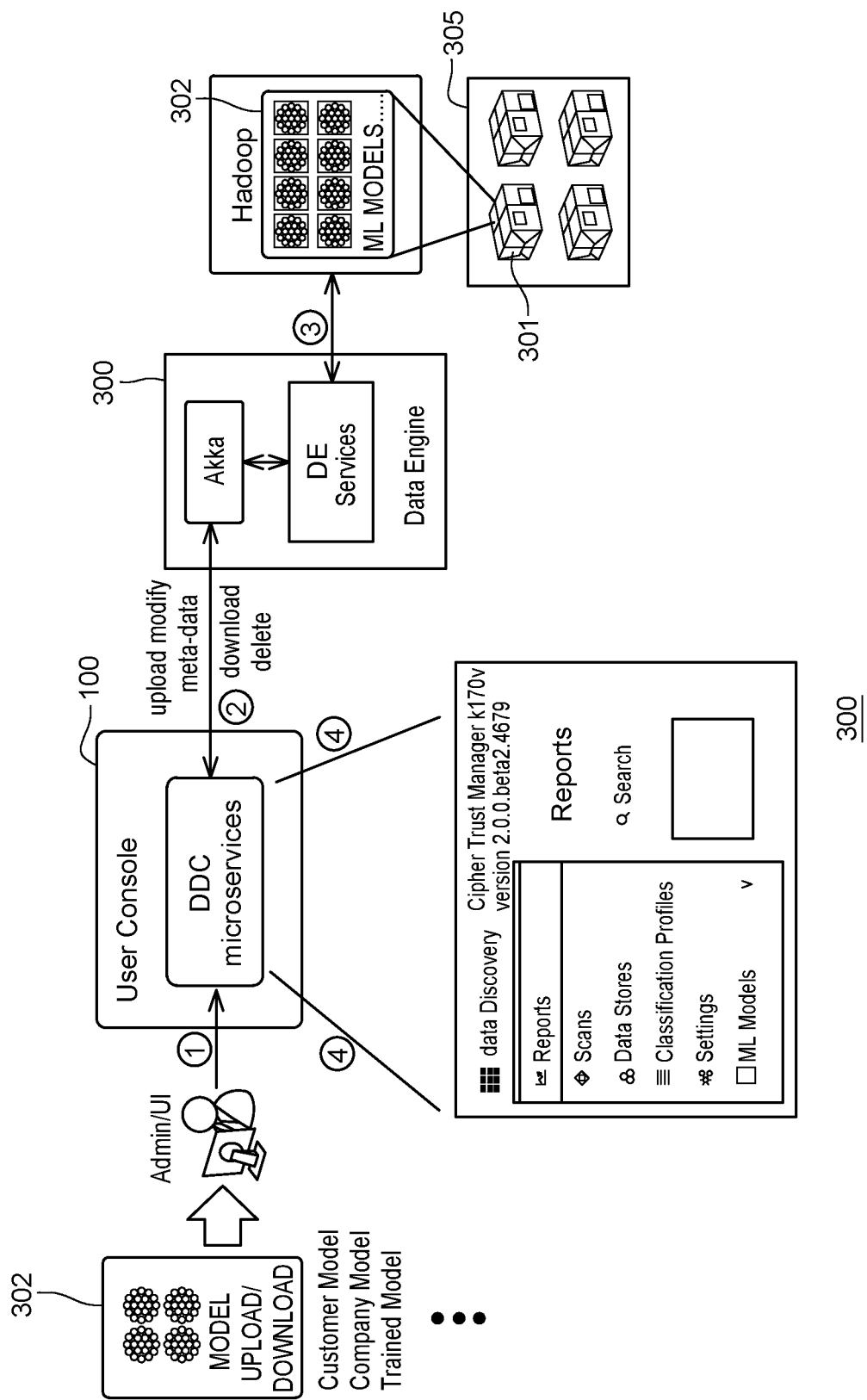
FIG. 3A illustrates a ML model package catalog management for the system of FIG. 1A in accordance with an embodiment.

FIG. 3A illustrates a ML model package catalog management platform 300 for the system 100 of FIG. 1A in accordance with an embodiment. The user console 100 provides the user or administrator visibility and management access to the ML data engine 300. Exemplary steps 1 to 4 are activities associated with ML model package management that are described in FIG. 3B. Referring now to the corresponding steps in FIG. 3B, at step 1, the user on the endpoint machine uploads, downloads, deletes and views ML model package 301 through the user console 100 UI. As seen in step 2, through the ML data engine 300 REST API, the user console UI 100 uploads, downloads and deletes ML model package 301, retrieves and modifies ML model package metadata. At step 3, the ML data engine 300 deletes and retrieves ML model package from storage (e.g., Apache® HDFS and Hbase), persists ML model package to storage, retrieves and modifies ML model package metadata in storage. At step 4, the user console 100 displays ML model package in UI.

Figure 4A:
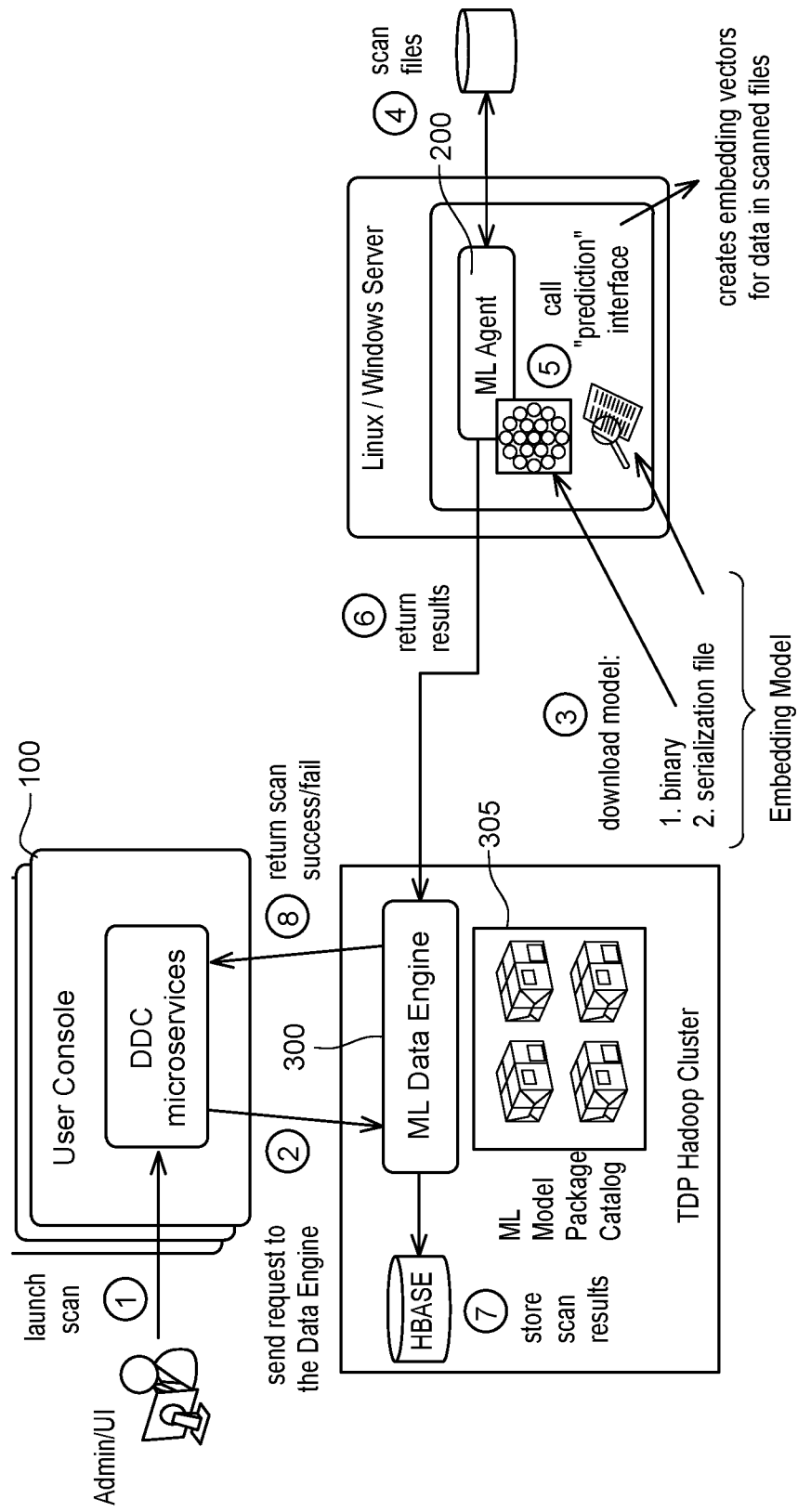
FIG. 4A illustrates a ML pipeline workflow for performing a ML embedding scan in accordance with an embodiment.

FIG. 4A illustrates a ML pipeline workflow 400 for performing a ML embedding scan in accordance with an embodiment. The embedding scan is the process to map the raw data into an embedding vector based on the ML embedding model. The raw data is the information generally resulting from the scan; it may be a text file, a document, a web page, a folder, a directory, or even numeric, or binary data. When the data is numeric the nomenclature of "embedding" is applicable. When the data is text based (e.g., characters, letters, symbols, etc.), the nomenclature of "word embedding" is applicable. For both, the embedding results in a numeric translation of a high-dimensional vector to a relatively low-dimensional space. Embedding make it easier to do machine learning on large inputs like sparse vectors representing words resulting from the data scan; embedding mitigates issues associated with high data dimensionality.

Word embedding is a word representation type that allows machine learning algorithms to understand words with similar meanings. Word embeddings map the words as real-valued numerical vectors. It does so by tokenizing each word in a sequence or sentence and converting them into a vector space. Word embeddings aim to capture the semantic meaning of words in a sequence of text. It assigns similar numerical representations to words that have similar meanings. It is a language modeling and feature learning technique to map words into vectors of real numbers using neural networks, probabilistic models, or dimension reduction on the word co-occurrence matrix. Some word embedding models are Word2vec (Google®), GloVe (Stanford), and fastText (Facebook®).

FIG. 4B depicts exemplary states of the workflow of FIG. 4A for a ML embedding scan by way of the system 100 of FIG. 1A in accordance with an embodiment. Reference will be made to FIG. 4A and components of the system 100 of FIG. 1A when describing the steps of the workflow. A Machine learning workflow defines which phases are implemented during a machine learning task, for example, responsive to a user selecting to train or predict scanned data. The typical phases of the workflow include data collection, data pre-processing, building datasets, model training and refinement, evaluation, and deployment.

Referring now to FIG. 4B, at step 1, the end user submits an embedding scan request from the user console 100 UI. The request contains ML embedding model package 301 identification, ML agent host information, and the scanned folder information. At step 2, the user console 100 sends the embedding scan request to the ML data engine 300 through REST API, and the ML data engine 300 adds embedding scan request into storage (e.g. Apache Hbase®). At step 3, the ML agent 200 polls and gets the embedding scan request from ML data engine 300, downloads the ML embedding model package 301 specified in request, and then instantiates its model executable 303 and loads model serialization file 302 into memory. At step 4, the ML agent 200 scans the folder specified in request. At step 5, the ML agent 200 calls "predict" interface exported from model executable for each scanned file, and gets the embedding vector for the scanned data. Here, the "predict" interface does not necessarily predict a classification of the data. Rather, it merely adopts the same interface naming convention as the ML prediction model interface so as to be a drop-in replacement for it. That is, the interface names and function calls are consistent between the ML embedding model and the ML prediction mode, although the underlying functionality exposed by the interface command names differs. At step 6, the ML agent 200 sends the embedding vector to ML data engine 300 through a distributed event store and stream-processing platform (e.g. Apache Kafka®). At step 7, the ML data engine 300 receives embedding vector from the distributed event store and stream-processing platform and saves embedding vector to storage (e.g. Apache Hbase®). At step 8, the ML data engine 300 updates request status to "success" or "fair" for user console 100 to retrieve and display.

Figure 5A:
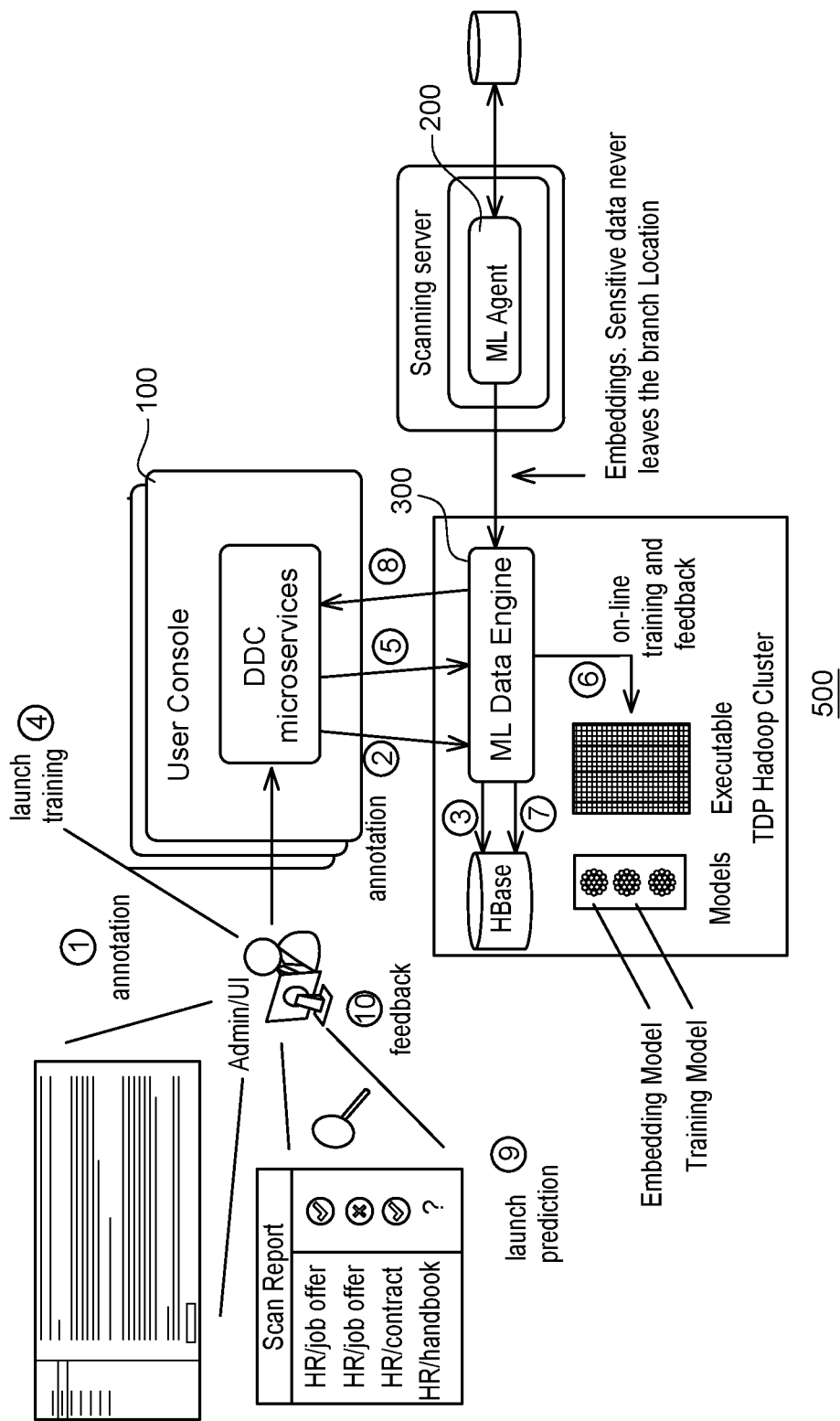
FIG. 5A illustrates a ML pipeline workflow for performing on-line training of ML models on premise in accordance with an embodiment.

FIG. 5A illustrates a ML pipeline workflow 500 for performing on-line training of ML models on premise in accordance with an embodiment. Briefly, ML training workflow is a process in which a machine learning algorithm is fed with training data from which it can learn. Training a ML model is the process whereby the numeric model determines optimal values for all its weights and bias terms from labeled embedding vectors. The labeling is provided either by previously trained or downloaded models, or from user feedback whereby the user manually annotates embedding vectors with labels. The system 100 supports various machine learning algorithms of its ML models (embedding, training and prediction), including, but not limited to, Linear regression, Logistic regression, Decision tree, SVM algorithm, Naive Bayes algorithm, KNN algorithm, K-means, and Random forest algorithm. Algorithms/Approaches may also include association rule learning, neural networks (NN), deep learning (convolutional NN, recurrent NN, Boltzman, etc.), dimensionality reduction (e.g. PCA, LDA, etc.) It may also incorporate various learning styles of machine learning in conjunction with the algorithms, such as supervised learning, unsupervised learning, and semi-supervised learning.

FIG. 5B depicts exemplary states of the workflow of FIG. 5A for on-line training of ML models in accordance with an embodiment. It should be noted that the on-line training workflow follows the embedding scan workflow. Accordingly, the raw data the user has selected and identified in their request will have been converted to an embedding vector when training commences. The training requires the embedding vector to be labeled. To this point, the user interface may visually show a correspondence of the raw data with the embedding vector, for example, showing a text sentence from a scanned data file, along with highlighting and mark-up on words or phrases within that sentence resulting from word embedding, to which labels will be appended.

At step 1, the end user submits data label from user console 100 UI. The label is an annotation onto the embedding vector, for example, a label of "person" applied to the name "John", or "location" applied to the text of an address "100 S. Waltham Street". At step 2, the user console 100 sends data label to ML data engine 300 through REST API. Here, the labels from the annotation activity will be associated with the embedding vector (provided by the ML embedding model) and applied to the ML training model. At step 3, the ML data engine 300 saves the data label into storage (e.g. Apache Hbase®). This will continue until the annotation is complete and that enough labels have been associated with the embedding vector. At step 4, the end user submits a model training request from the user console 100 UI. The request contains the ML training model package 301, label information and embedding identification information (e.g., embedding vector and corresponding ML embedding model).

At step 5, the user console 100 sends the model training request to ML data engine 300 through REST API, and ML data engine 300 adds model training request into storage (Apache Hbase®). At step 6, the ML data engine 300 training worker process gets model training request from storage, instantiates model executable, calls "fit" interface exported from model executable with label and embedding vector as input parameters and starts training process. Curve fitting is a type of optimization that finds an optimal set of parameters for a defined function that best fits a given set of observations. Here, the "fit" interface attempts to fit the embedding vector to the assigned label, for example, via any of the aforementioned machine learning algorithms and learning styles. If training is successful (e.g. curve fitting to a predetermined threshold), the ML data engine 300 saves the trained model serialization file and related model executable into storage (e.g. Apache HDFS®).

At step 7, the ML data engine 300 saves trained model metadata record into the storage if training is successful. At step 8, the ML data engine 300 updates request status to "success" or "fail" for user console 100 to retrieve and display. At step 9, the end user submits prediction scan request from the user console 100 UI. The request contains trained prediction model package 301 identification, ML agent host and folder information. At step 10, the end user reviews prediction scan result, updates data label and start new training to improve the previous trained model.

Figure 5C:
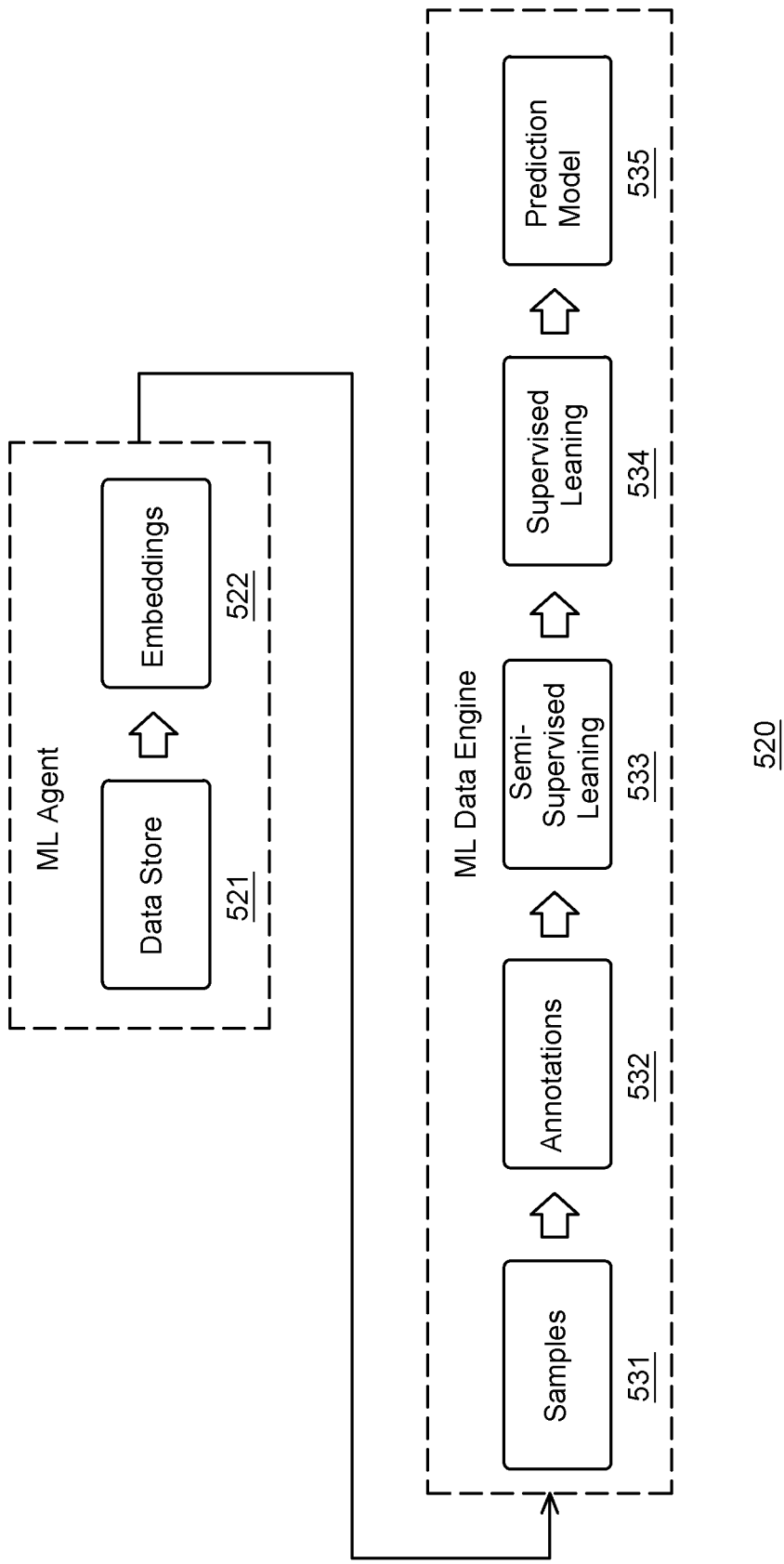
FIG. 5C depicts steps of components of the system of FIG. 2A for the workflow of FIG. 5B for producing prediction models in accordance with an embodiment.

FIG. 5C depicts steps of components of the system of FIG. 2A for the on-line training workflow of FIG. 5B for producing prediction models in accordance with an embodiment. Notably, a ML prediction model is produced once training is complete or successful, and it is based off the ML training model but supplemented with additional information, including the embedding model. The data store 521 contains the scanned data and other user request information associated with training. The embeddings 522 map the document and entity components of the scanned data to multi-dimensional vector data points as previously mentioned. The embedding process may include transformations. For example, Bidirectional Encoder Representations from Transformers (BERT) provides for a language model that is bidirectionally trained to have a deeper sense of language context and flow than single-direction language models. As opposed to directional models, which read the text input sequentially (left-to-right or right-to-left), the Transformer encoder reads the entire sequence of words at once. Therefore it is considered bidirectional, though it would be more accurate to say that it's non-directional. This characteristic allows the model to learn the context of a word based on all of its surroundings (left and right of the word)

The sampling 531 is used to divide data points into a number of groups based on similarity (K-Means model or other cluster based algorithms), and sample data points from each group based on distance to cluster centroid. The annotation 532 provides a label onto document or text for classification and label entity for named entity recognition with sampled data points. The Semi-supervised machine learning 533 propagates the document or text labels to surrounding unlabeled data points (K-Nearest Neighbors). The Supervised machine learning 534 trains the classification models (ML training model, ML prediction model) using the document or text embedding vector and label. It also trains the Named Entity Recognition model using entity embedding and label. For example, a Deep Neural Network (DNN) is used to classify unstructured data, and Named Entity Recognition (NER) is used to detect sensitive entities within the unstructured data. The prediction model 535 is thereafter produced.

Named entity recognition (NER) is the process of identifying and classifying named entities presented in a text document. It is a subtask of information extraction that seeks to locate and classify named entities mentioned in unstructured text into pre-defined categories such as person names, organizations, locations, medical codes, time expressions, quantities, monetary values, percentages. NER is an application of natural language processing (NLP) and its main goal is to extract relevant information from text data. It automatically classifies named entities according to pre-defined categories such as individuals, places, dates, etc. Named entities can also be numerical expressions like phone numbers or times. NER scans whole text and detects named entities: It detects the sentence boundaries in a given document based on capitalization rules. Identifying the sentence boundaries will assist NER in finding and extracting relevant information from the document for the next steps. It then categorize entities into predefined categories: In order to tag words or phrases, entity categories such as location, people, event, time, organization, and so on must be clearly defined. The entity extraction model can then be trained with pre-defined categories so that it can identify entities such as people, places, and organizations in raw texts.

Figure 6A:
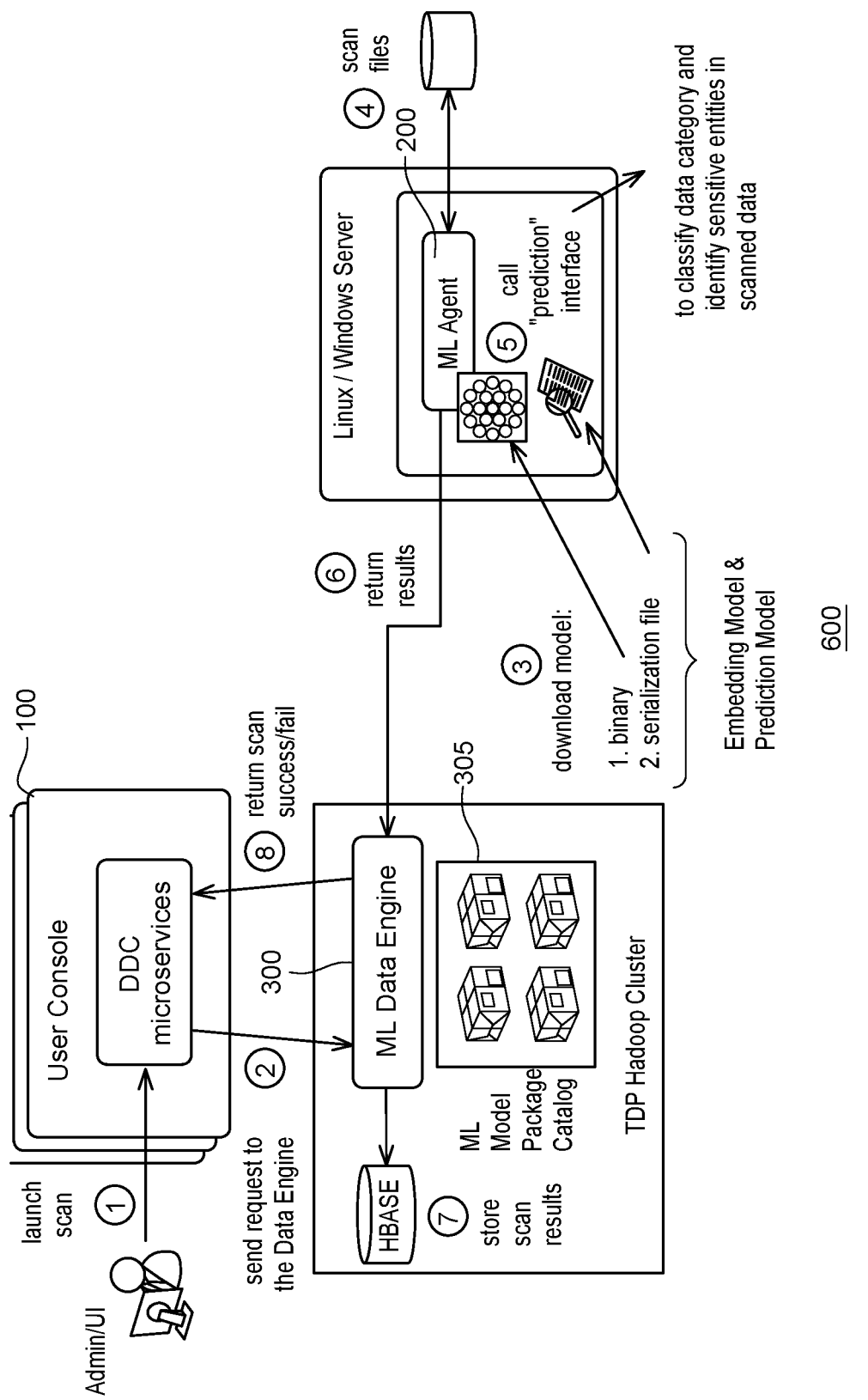
FIG. 6A illustrates a ML pipeline workflow for predicting a classification of scanned data and identifying sensitive entities therein using prediction models in accordance with an embodiment.

FIG. 6A illustrates a ML pipeline workflow 600 for predicting a classification of scanned data and identifying sensitive entities therein using prediction models in accordance with an embodiment. Exemplary steps 1 to 4 are activities associated with ML pipeline workflow 600 that are described in FIG. 6B. Notably, FIG. 6A corresponds closely to FIG. 4A with slight variations. In FIG. 6A, it uses both the embedding model and prediction model, where in FIG. 4A it uses the embedding model. The embedding model is used in both workflows because it is what obfuscates the data and created the embedding vector (applicable to both training and prediction). Also, in FIG. 6A the "predict" interface exported from corresponding model executable is used to classify data category and identify sensitive entities in scanned data, whereas in FIG. 4A, the ML agent 200 calls "predict" interface exported from model executable for each scanned file to create embedding vectors for data in scanned files.

In machine learning, classification refers to a predictive modeling problem where a class label is predicted for a given example of input data. Here, the workflow 600 is applied when the user scans unknown and/or uncategorized data on their endpoint machine and wants to know the categories and sensitive entities of the scanned data. Recall, the system 100 for data discovery and classification when configured for machine based learning of sensitive data, by way of ML pipeline workflow 600 to obfuscate data, provides for the classification of different data types determined by federal regulations. The system 100 helps the user and organization stay compliant with various relevant industry-specific regulations, including SOX, PCI DSS, GDPR, and HIPPA. The ML pipeline workflow 600 helps to identify the value of scanned data, what risk the sensitive data is exposed to, and implement needed controls to mitigate identified risk Sensitive data is any type of classified information that must be protected and made inaccessible to parties without the proper authorization. This type of data includes personally identifiable information and protected health information, among others. Both ethical and legal reasons warrant the need to have strict restrictions for access to these types of data. Specifically, the inherent risk of cyber threats and breaches puts greater emphasis on identifying sensitive data and classifying the information therein.

FIG. 6B depicts exemplary states 1 to 8 of the workflow of FIG. 6A for deploying prediction models to classify scanned data and identify sensitive entities therein in accordance with an embodiment.

At step 1, the end user submits prediction scan request from user console 100 UI. The request contains trained prediction model package 301 identification, ML agent host and folder information. At step 2, user console 100 sends prediction scan request to ML data engine 300 through REST API, and ML data engine 300 adds prediction scan request into storage (Apache Hbase®). At step 3, ML agent 200 polls and gets prediction scan request from ML data engine 300, downloads prediction model package 301 specified in the request, instantiates model executable and loads model serialization file into memory.

At step 4, ML agent 200 scans the folder specified in user request. This is the data that the user desires to scan to receive a prediction on the data to indicate a data classification and the sensitive entities therein. At step 5, ML agent 200 calls "predict" interface exported from model executable for each scanned file to classify data category and identify sensitive entity. Here, this will implicitly generate an embedding vector to obfuscate the scanned data. This embedding vector is then classified against the embedding vector and corresponding label of the ML prediction model 301 by way of the calling interface "predict". At step 6, ML agent 200 sends data category and sensitive entity to ML data engine 300 through a distributed event store and stream-processing platform (e.g. Apache Kafka®). At step 7, ML data engine 300 receives data category and sensitive entity from the distributed event store and stream-processing platform and saves them to storage. At step 8, ML data engine 300 updates request status to "success" or "fail" for user console 100 to retrieve and display.

Other Embodiments

In some embodiments the ML embedding model takes into consideration the security zone and the security policy by extracting parameters therefrom as features and adapts the embedding vector accordingly to comply with user-privacy laws and protect against leakage of sensitive data. For example, if the security zone can be take on values of low to high (e.g., 1-4), for instance a level-4 for highest protection level, yet the security policy at the branch location is less stringent and differs between data stops in transit to the ML engine at another location, for instance a level-1 for lowest protection, the embedding model will adapt which features are extracted accordingly. For example, with a low-level security policy only a smaller subset of the security zone parameters are extraced, whereas with a high-level security policy a larger set of the security zone parameters are extracted. In another, or non-adaptive arrangement, the embedding model may extract all the security zone and security policy parameters as features themselves in creating the embedding vector.

A security zone allows an administrator to create a strong access control policy that controls the traffic between parts of the network. For example, as a feature on an API Gateway it allows the Administrator to partition portions of the API Gateway to be managed by other administrators. A security zone is a collection of related entities (for example: services, policies, folders, trusted certificates). Security zones extend the built-in roles to help more precisely control who has access to what resources therein. Security Zone examples include but are not limited to ExternalZone, DMZZone and InternalZone. Security zone tasks include add, edit, remove zones and manage user roles and permissions. It allows admins to edit policy fragments to check things like source IP addresses and dit policy fragments dealing with TLS and message-level encryption.

A security policy is a document that states in writing how a company plans to protect its physical and information technology (IT) assets. Security policies are living documents that are continuously updated and changing as technologies, vulnerabilities and security requirements change. Physical security policies include the following information: sensitive buildings, rooms and other areas of an organization; who is authorized to access, handle and move physical assets; procedures and other rules for accessing, monitoring and handling these assets; and responsibilities of individuals for the physical assets they access and handle. Many legal requirements and regulations are aimed at security sensitive information. For example, Payment Card Industry Data Security Standard dictates how organizations handle consumer payment card information. Key elements of a security policy may include statements of purpose, to whom the policy applies, objectives, authority and access controls, data classification that divide data into categories of sensitivity, metrics, and statements of use, responsibilities and duties.

The embedding model may adaptively extract one or more of the aforementioned security policy features in view of the security zone, for example, embedding more of the security policy features as the security level zone increases, and embedding less of the features as the security zone level decreases. In other models, one or more parameters of the security policy that include purpose, audience, objectives, authority, data classification, data sensitivity, and encryption policy are extracted as a first set of features of the embedding vector along with one or more parameters of the security zone that include type, level, location, name, trust, certificates, and data traffic rules extracted as a second set of features. Here, the parameters of the security zone and security policy extracted as features may help data discovery and classification, for example, to identify and categorize data and document types, permissions, and privileges. In another arrangement, values of all the parameters for both the security policy and security zone are extracted as features and included in the embedding vector.

The components of the system 100 of FIG. 1A, such as the user console 100, ML agent 200, and ML data engine 300 are implemented and realized as computer program products comprising executable machine code or as software modules comprising code that runs on a hardware processor such as a central processing unit or general processing unit. Sub-components thereof, such as the ML pipeline 120, ML model package 301, and catalog 305, may be configured as a computer program or files that executes on a hardware based processing machine or transferred across a network to other computational machines or devices. The method steps of FIGS. 3B, 4B, 5B and 6B can be performed by a hardware processor of a respective computational machine executing computer program code instructions from an electronic memory to execute the method steps. At least one a hardware processor of a machine can execute computer program code instructions from an electronic memory to execute processes of the aforementioned components running on an operating system of said machine to support operation of said components, modules, programs or processes. In some embodiments the system 100 may be distributed as communicatively coupled components across a network, internet or cloud. One example is the Thales® CipherTrust Data Discovery and Classification tool. In some embodiments it may be represented as a tool for data discovery, to find sensitive data within an organization, helping to eliminate threats to business continuity and reduce data footprints, to assess risks of non-compliance and determine the appropriate protection actions.

What is claimed, is:

1. A system for Machine Learning (ML) based Data Discovery and Classification (DDC), the system comprising components of:
   a user console (100), running on an endpoint machine at a branch location managing and accessing data in a security zone under a security policy, said data in part is private or sensitive, for
      processing user requests for data discovery and classification (DDC) on the endpoint machine;
      ingesting user requests into a ML pipeline for embedding, training and deploying ML models on said data produced via DDC;
      displaying classified data category and identified sensitive entities of said data on the endpoint machine by way of the ML pipeline;
   a ML agent (200), communicatively coupled to the user console, also running on the endpoint machine and residing at the branch location, for
      polling said user requests by way of the ML pipeline;
      scanning the endpoint machine for said data responsive to user requests,
      embedding said data to produce an embedding vector that is ingested into the ML pipeline instead of clear data;
      applying ML models to the data scanned;
   a ML data engine (300), communicatively coupled to the user console and the ML agent, and not residing at the branch location with said security zone, for
      handling user requests from user console and ML agent on the ML pipeline; receiving said embedding vector on the ML pipeline;
      labeling said embedding vector with labels responsive to user annotations; persisting, training, updating, and applying ML models for use by the ML agent,
   wherein said components execute on a computational device comprising one or more processors and memory coupled to the one or more processors, wherein the memory includes computer instructions which when executed by the one or more processors causes the one or more processors to perform said operations.

2. The system of claim 1, wherein the embedding extracts parameters from the security zone and the security policy as features and adapts accordingly to comply with user-privacy laws and protect against leakage of sensitive data.

3. The method of claim 2, wherein the embedding provides a solution for compliance with user-privacy laws and protects against leakage of sensitive data.

4. The system of claim 2, wherein the ML pipeline codifies and automates a ML workflow for data discovery and classification in the user console, the ML agent and the ML data engine, and said workflow provides for processing requests, handling messages, data scanning, embedding data, sampling, annotating, cleaning, training models, persisting models, and applying models.

5. The system of claim 2, wherein one or more parameters of the security policy that include purpose, audience, objectives, authority, data classification, data sensitivity, and encryption policy are extracted as a first set of features of the embedding vector along with one or more parameters of the security zone that include type, level, location, name, trust, certificates, and data traffic rules extracted as a second set of features.

6. The system of claim 1, wherein sensitive entities includes private information or private data including, but not limited to: URL, entity, gender, sex, race, ethnicity, occupation, marital status, citizenship, or phone numbers.

7. The system of claim 1, wherein said ML model is one of:
 an ML embedding model to generate an embedding vector from said data;
 a ML training model based on annotation labels and embedding vectors; and
 a ML prediction model to classify said data and identify sensitive entities within said data.

8. The system of claim 7, wherein the ML pipeline supports workflows consisting of:
 an ML model embedding scan workflow;
 an ML model on-line training workflow; and
 an ML model prediction scan workflow.

9. The system of claim 8, wherein ML model package catalog management is provided via:
 the user console (100), that by way of the ML data engine (300),
 processes user input for uploading, downloading, deleting and viewing ML model packages for ML embedding models, ML training models and ML prediction models; and
 displays package information and utilities on the ML pipeline for performing each of the three workflows.

10. The system of claim 8, wherein for the embedding scan workflow:
 the user console (100) responsive to user input submits an embedding scan request on the ML pipeline;
 the ML agent (200) polls and retrieves the embedding scan request on the ML pipeline and downloads downloads, instantiates, and runs the ML embedding model;
 the ML agent (200) scans a folder identified in the user request, the folder containing data on the endpoint machine; and
 the ML agent (200) embeds the data using the ML embedding model and submits the embedding vector, with obfuscated data therein, to the ML pipeline.

11. The system of claim 10, wherein for the ML model on-line training workflow: the user console (100), responsive to the embedding scan workflow, thereafter receives data labels submitted by the user for the embedding vector, and submits a model training request with the data labels on the ML pipeline; the ML agent (200) polls and retrieves the on-line training request on the ML pipeline with the data labels, and downloads, instantiates, and runs the ML training model; the ML data engine (300), samples multi-dimensional vector data points of the embedding vector into a number of groups by way of K-Means clustering; annotates the embedding vector in the groups with the user-provided data labels for classification for named entity recognition; applies a semi-supervised machine learning by way of K-Nearest Neighbors to propagate document labels to surrounding unlabeled data points; and applies supervised machine learning by way of a Neural Network to train the ML prediction model using embedding vector with labels as inputs.

12. The system of claim 8, wherein for the ML model prediction scan workflow:
 the user console (100) handles a user request responsive to the user submitting a prediction scan request on the ML pipeline;
 the ML agent (200) polls and retrieves the prediction scan request on the ML pipeline and downloads, instantiates, and runs a package for the ML model;
 the ML agent (200) scans a folder for data identified in the user request and embeds the data using the ML embedding model from the package and submits the embedding vector to the ML pipeline;
 the ML data engine (300) responsive to an interface call for prediction, retrieves the embedding vector from the ML pipeline, applies the ML prediction model from the package to each scanned file in the folder, and classifies the data into data categories and identifies sensitive entity in the data categories.

13. The system of claim 8, wherein communication on the ML pipeline for each workflow, by and between the user console (100), the ML agent (200) and the ML data engine (300), is via RESTful Application Programming Interfaces (APIs).

14. The system of claim 7, wherein said ML model consists of:
 a metadata record consisting of ML model information, such as, identifier (ID), name, model type, national language, target file type, serialization file, executable binary, executable artifact and model description;
 a serialization file that converts data objects of the ML model into a transmittable format over the ML pipeline; and
 an executable binary that implements a predefined public call interface, which is invoked over the ML pipeline to interact with training, embedding and trained prediction models.

15. The system of claim 1, wherein said ML data engine (300) comprises:
 a Deep Neural Network (DNN) to classify unstructured data; and
 a Named Entity Recognition (NER) to detect sensitive entities within said unstructured data.

* * * * *